US009764768B1

United States Patent
Hokes et al.

(10) Patent No.: US 9,764,768 B1
(45) Date of Patent: Sep. 19, 2017

(54) LATERAL RETENTION MEMBER

(71) Applicant: Honda Motor Co., Ltd., Tokyo (JP)

(72) Inventors: Michael J Hokes, Dublin, OH (US); Joseph H Korte, Marysville, OH (US); Dustin L Hinders, Lakeview, OH (US); Matthew L Taracko, Marysville, OH (US); Stephen L Paulos, Powell, OH (US); Kirk M Rausch, North Lewisburg, OH (US); Jacob O Borth, Columbus, OH (US); Luke M Upah, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/053,317

(22) Filed: Feb. 25, 2016

(51) Int. Cl.
*B62D 25/02* (2006.01)
*B62D 31/00* (2006.01)
*B60R 21/13* (2006.01)

(52) U.S. Cl.
CPC .............. *B62D 25/02* (2013.01); *B60R 21/13* (2013.01); *B62D 31/00* (2013.01)

(58) Field of Classification Search
CPC .......... B62D 25/02; B62D 31/00; B60R 21/13
See application file for complete search history.

(56) References Cited

U.S. PATENT DOCUMENTS

| | | | |
|---|---|---|---|
| 3,804,435 A | 4/1974 | See | |
| 7,735,896 B2 * | 6/2010 | Kubota | B60N 2/3013 296/37.14 |
| 7,770,981 B2 * | 8/2010 | King | B60P 1/167 298/17.5 |
| 8,328,235 B2 | 12/2012 | Schneider et al. | |
| 8,353,534 B2 * | 1/2013 | Arnold | B60N 2/3013 280/748 |
| 8,556,324 B1 | 10/2013 | Yamamoto et al. | |
| 8,585,088 B1 | 11/2013 | Kaku et al. | |
| 8,714,618 B1 * | 5/2014 | Heit | B60P 3/423 296/64 |

(Continued)

FOREIGN PATENT DOCUMENTS

EP  2698274 A1  2/2014

OTHER PUBLICATIONS

"Polaris Sportsman Ace" http://www.superatv.com/Polaris-Sportsman-Ace-2-Inch-Lift-Kit-P10445.aspx, Accessed Sep. 25, 2015.

*Primary Examiner* — Darlene P Condra
(74) *Attorney, Agent, or Firm* — Honda Patents & Technologies North America, LLC; Mark E. Duell

(57) ABSTRACT

A motor vehicle includes a frame, a first pair of wheels connected to the frame, a second pair of wheels connected to the frame, a motor supported by the frame and operatively connected to at least one of the pair of wheels, a cockpit in the frame, a first seat disposed in the cockpit, a bed in the frame longitudinally rearward of the cockpit, the bed having at least one side wall, a second seat disposed in the bed, the second seat having a seat base and a seat back, the seat back being foldable between a storage position and a seating position, and a lateral retention member fixed to the at least one side wall of the bed, at least a portion of the lateral retention member being disposed higher than the seat base and forward of the seat back of the second seat when in the seating position.

16 Claims, 13 Drawing Sheets

(56) References Cited

U.S. PATENT DOCUMENTS

| | | | | |
|---|---|---|---|---|
| 8,752,879 B1* | 6/2014 | Heit | ............ | B60P 3/423 |
| | | | | 296/39.1 |
| 8,869,929 B2 | 10/2014 | Yamamoto et al. | | |
| 8,925,670 B2 | 1/2015 | Shinbori et al. | | |
| 8,960,754 B1* | 2/2015 | Maeda | ............ | B60R 11/06 |
| | | | | 224/275 |
| 8,979,123 B1 | 3/2015 | Takahashi et al. | | |
| 8,998,255 B1 | 4/2015 | Shinbori | | |
| 9,004,532 B1 | 4/2015 | Hirooka | | |
| 9,056,576 B2 | 6/2015 | Yamamoto et al. | | |
| 9,457,756 B2* | 10/2016 | Hirooka | ............ | B60R 21/13 |
| 2007/0290521 A1* | 12/2007 | Houston | ............ | B60N 2/3065 |
| | | | | 296/182.1 |
| 2008/0217897 A1 | 9/2008 | Latussek | | |
| 2010/0060026 A1* | 3/2010 | Bowers | ............ | B60N 2/3013 |
| | | | | 296/66 |
| 2010/0314191 A1* | 12/2010 | Deckard | ............ | B60R 21/13 |
| | | | | 180/312 |
| 2014/0210195 A1* | 7/2014 | Nadeau | ............ | B60N 2/68 |
| | | | | 280/756 |
| 2014/0210234 A1* | 7/2014 | Ricketts | ............ | B60R 22/24 |
| | | | | 296/193.03 |
| 2014/0224561 A1 | 8/2014 | Shinbori et al. | | |
| 2014/0353956 A1* | 12/2014 | Bjerketvedt | ............ | B60N 3/06 |
| | | | | 280/756 |
| 2015/0014974 A1 | 1/2015 | Cotnoir et al. | | |
| 2015/0041237 A1* | 2/2015 | Nadeau | ............ | B60K 5/00 |
| | | | | 180/292 |
| 2015/0047917 A1 | 2/2015 | Burt et al. | | |
| 2015/0274120 A1* | 10/2015 | Hayashi | ............ | B60R 22/18 |
| | | | | 280/771 |
| 2016/0090057 A1* | 3/2016 | Hirooka | ............ | B60R 21/13 |
| | | | | 296/190.03 |
| 2016/0096478 A1* | 4/2016 | Reynolds | ............ | B60R 9/02 |
| | | | | 280/834 |

* cited by examiner

US 9,764,768 B1

LATERAL RETENTION MEMBER

TECHNICAL FIELD

The embodiments disclosed are related to the field of retention members for side-by-side motor vehicles.

BACKGROUND

Side-by-side utility vehicles have a generally open construction. In order to protect the cockpit, the utility vehicle may include a roll over protection structure, which may include a roll cage and netting. It is advantageous to include additional structure to protect the cockpit seating area, particularly the upper torso of an occupant.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to an aspect of the embodiments, a motor vehicle includes a frame, a first pair of wheels connected to the frame, a second pair of wheels connected to the frame, a motor supported by the frame and operatively connected to at least one of the pair of wheels, a cockpit in the frame, a first seat disposed in the cockpit, a bed in the frame longitudinally rearward of the cockpit, the bed having at least one side wall, a second seat disposed in the bed, the second seat having a seat base and a seat back, the seat back being foldable between a storage position and a seating position, and a lateral retention member fixed to the at least one side wall of the bed, at least a portion of the lateral retention member being disposed higher than the seat base and forward of the seat back of the second seat when in the seating position.

According to another aspect, a motor vehicle includes a frame, a first pair of wheels connected to the frame, a second pair of wheels connected to the frame, a motor supported by the frame and operatively connected to at least one of the pair of wheels, a cockpit in the frame, a roll cage supported by the frame encapsulating the cockpit, a first seat disposed in the cockpit, a bed in the frame longitudinally rearward of the cockpit, the bed having at least one side wall, a second seat disposed in the bed, the second seat having a seat base and a seat back, the seat back being foldable between a storage position and a seating position, a first lateral retention member fixed to the roll cage, at least a portion of the lateral retention member being disposed higher than the seat base and forward of the seat back of the first seat when in the seating position, and a second lateral retention member fixed to the at least one side wall of the bed, at least a portion of the lateral retention member being disposed higher than the seat base and forward of the seat back of the second seat when in the seating position.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are described with reference to the Figures in which like reference numbers indicate identical or functionally similar elements. Also in the figures, the left most digits of each reference number corresponds to the figure in which the reference number is first used.

Figure 1:
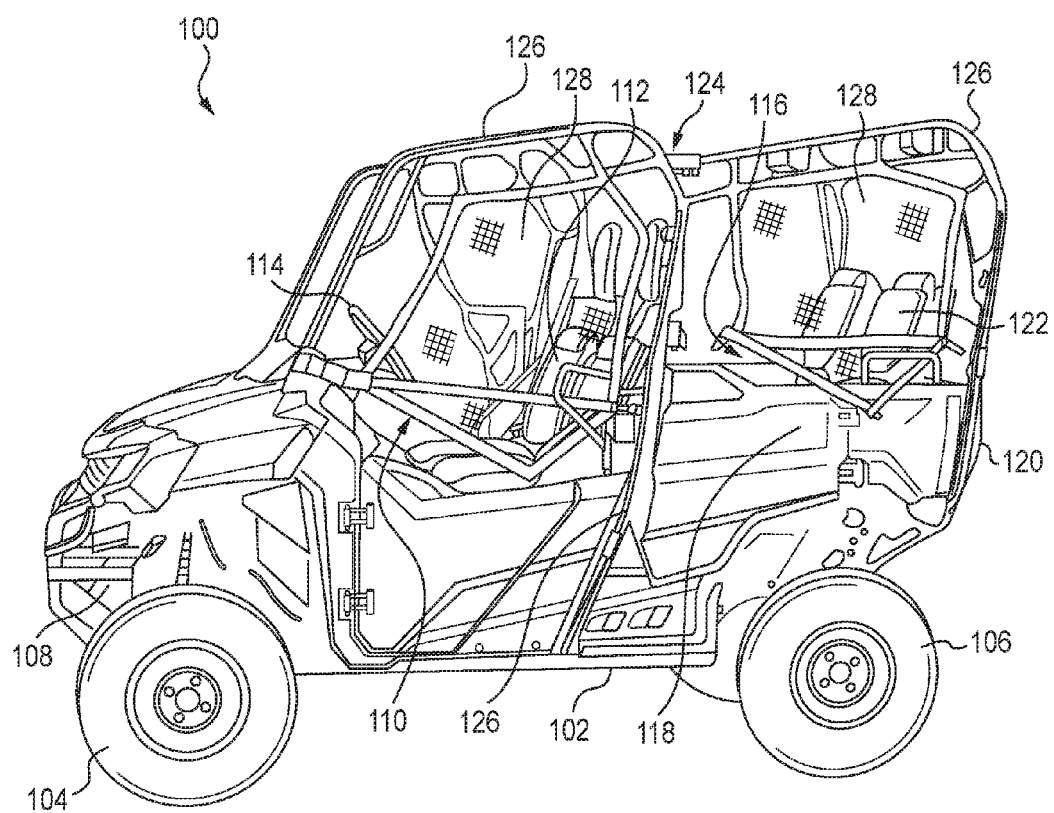
FIG. 1 is side perspective view of a motor vehicle.

FIG. 1 illustrates an embodiment of a motor vehicle 100. The motor vehicle 100 includes a frame 102, a front pair of wheels 104 and a rear pair of wheels 106 connected to the frame 102, and a motor 108 held by the frame 102 that is operatively connected to at least one of either the front wheels 104 or rear wheels 106. A cockpit 110 is located in the middle of the frame 102, in which is located the front seat 112 of the motor vehicle 100, as well as the driver controls, such as the steering wheel 114 and the like, necessary for an user to drive the motor vehicle 100. Located longitudinally rearward of the cockpit 110 is a bed 116, in which cargo may be loaded. The bed includes sidewalls 118 and a tailgate 120 that help to stow cargo. In the embodiment shown in FIG. 1, the bed 116 also includes a fold-down second row seat 122, which enables the motor vehicle 100 to carry additional passengers.

As illustrated in FIG. 1, the motor vehicle also includes a roll over protection structure 124. The roll over protection structure 124 includes a roll cage 126, which protects the cockpit 110 and bed 116 in the event of a rollover, and netting 128, which helps to prevent users or cargo from being ejected from the motor vehicle 100 in the event of a rollover.

Figure 2:
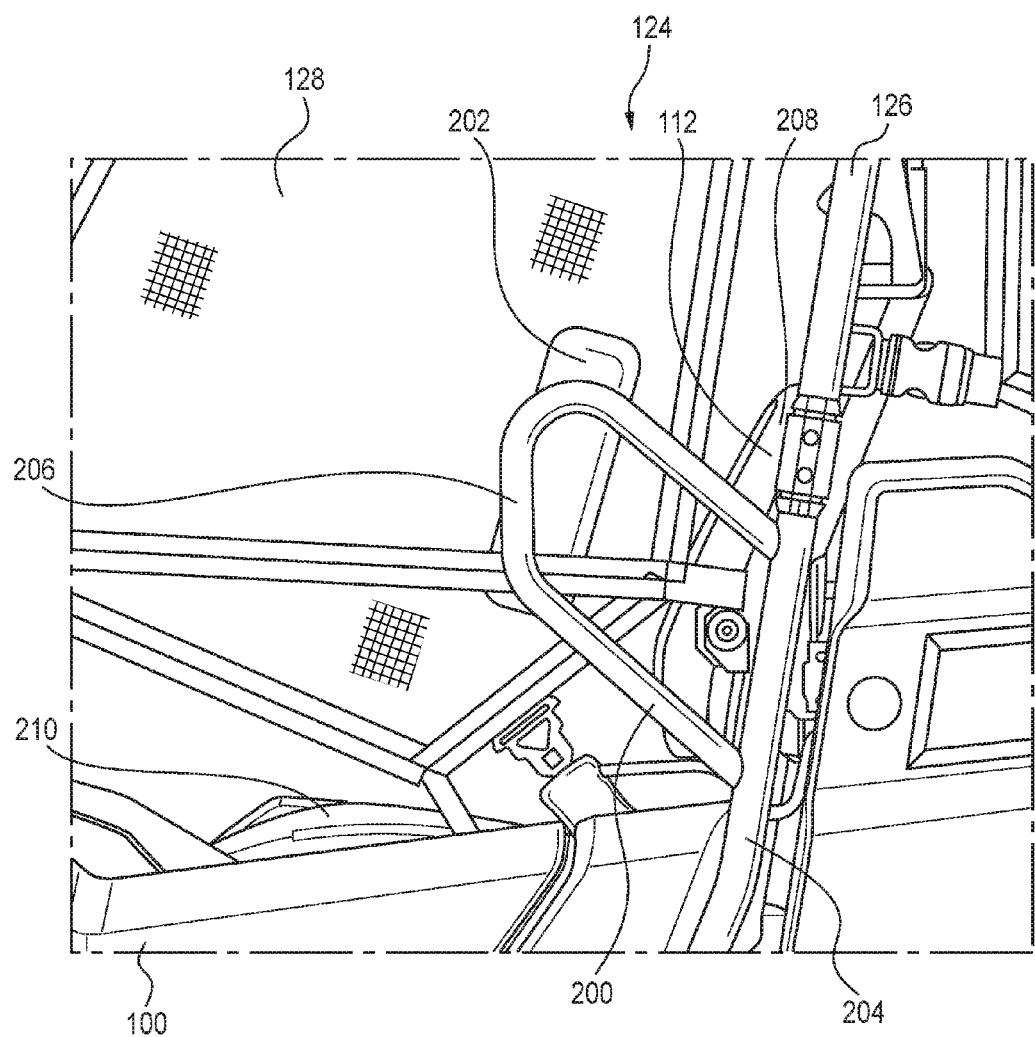
FIG. 2 is a close up view of one embodiment of a front lateral retention member of the motor vehicle in FIG. 1.
Figure 3:
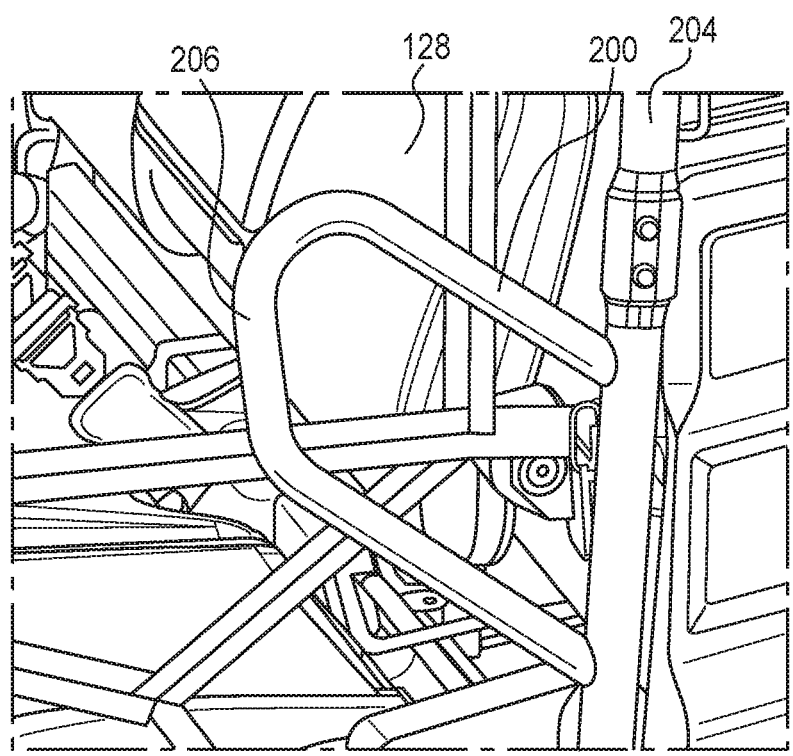
FIG. 3 is a side perspective view of the front lateral retention member of FIG. 2.
Figure 4:
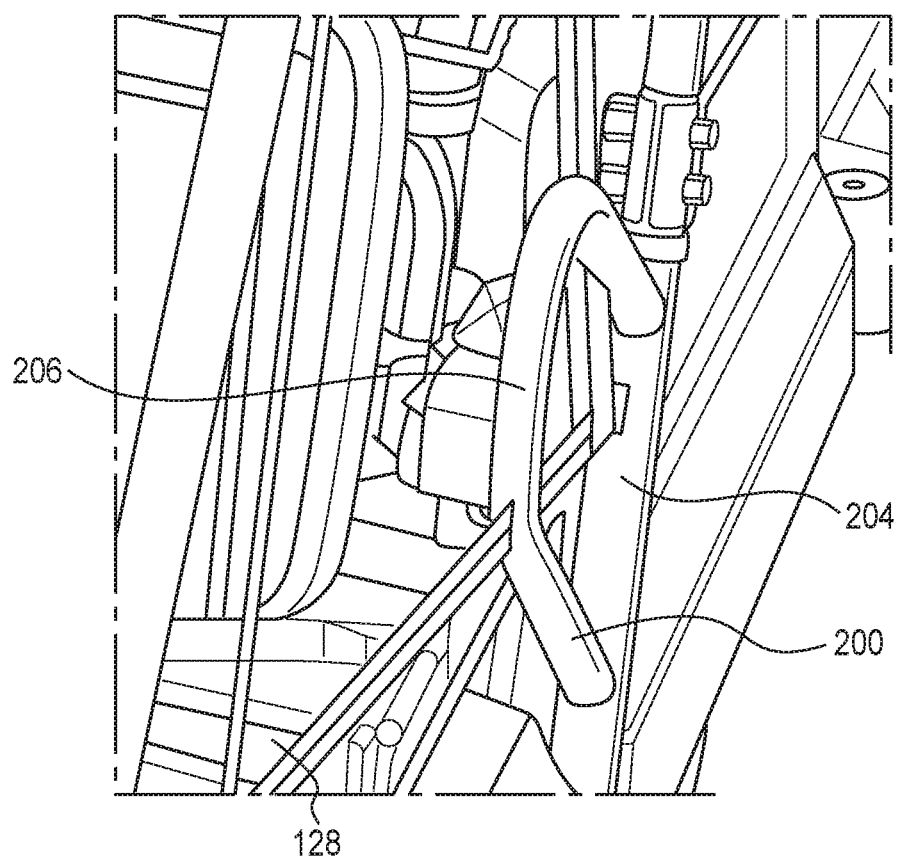
FIG. 4 is a front perspective view of the front lateral retention member of FIG. 2.
Figure 5:
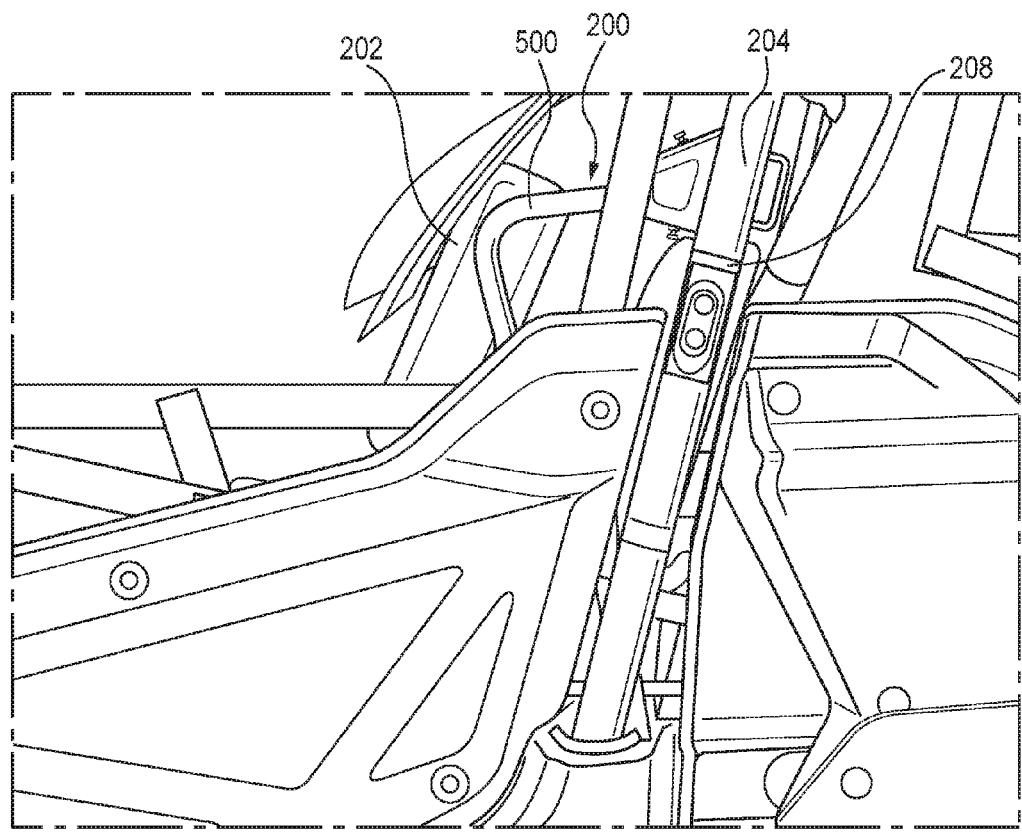
FIG. 5 is a close up view of another embodiment of a front lateral retention member of the motor vehicle in FIG. 1.
Figure 6:
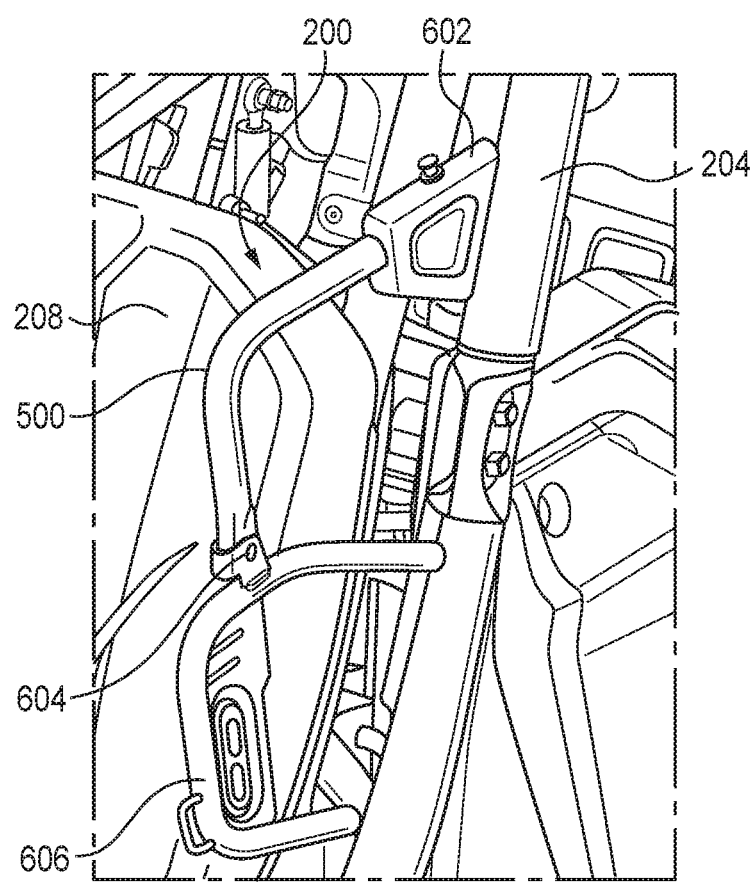
FIG. 6 is a side perspective view of the front lateral retention member of FIG. 5.
Figure 7:
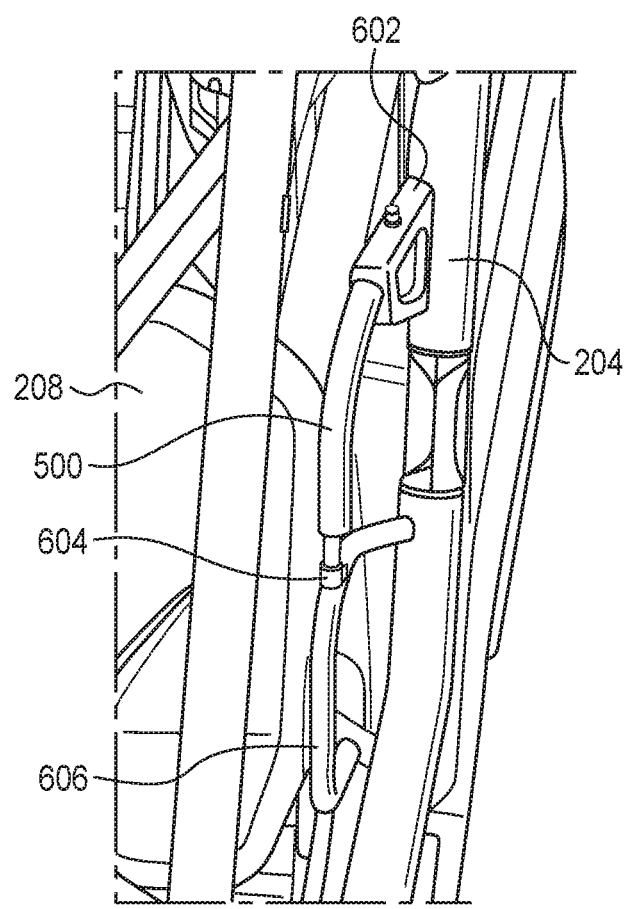
FIG. 7 is a front perspective view of the front lateral retention member of FIG. 5.

The roll over protection structure 124 further includes a front lateral retention member 200, one embodiment of which is illustrated in FIGS. 2-4, and a second embodiment of which is illustrated in FIGS. 5-7. The front lateral retention member 200 operates as part the roll over protection structure 124 by being adjacent the torso of a user to keep the torso inside of the motor vehicle 100 during a rollover event. As shown in FIG. 3, block 202 represents the upper arm of a user seated in the front seat 112 of the motor vehicle 100. The front lateral retention member 200 is a generally U-shaped tube or pipe 206, the ends of which are welded to the B-pillar 204 of the roll cage 126 of the rollover protection structure 124. The front lateral retention member 200 is located primarily forward of the seat back 208, above the seat cushion 210, and beneath the top of the block 202, signifying that the front lateral retention member 200 is adjacent the upper arm and beneath the shoulder of the typical user. In the embodiment shown, the netting 128 is located inside of the front lateral retention member 200, between the front lateral retention member 200 and the front seat 112.

FIGS. 5-7 illustrate an alternate embodiment of the front lateral retention member 200. As illustrated in FIG. 6, the front lateral retention member 200 is a generally L-shaped tube or pipe 500 that includes brackets 602, 604 at each end. The brackets 602, 604 are in turn bolted to the roll over protection structure 124. The upper bracket 602 is bolted to the B-pillar 204 of the roll cage 126, and as shown in FIGS. 6-7, the lower bracket 604 is bolted to a support structure 606 of the roll cage 126 attached to the B-pillar 204. As with the previous embodiment, the front lateral retention member 200 is located primarily forward of the seat back 208, above the seat cushion (not shown), and beneath the top of the block 202, signifying that the front lateral retention member 200 is adjacent the upper arm and beneath the shoulder of the typical user.

Figure 8:
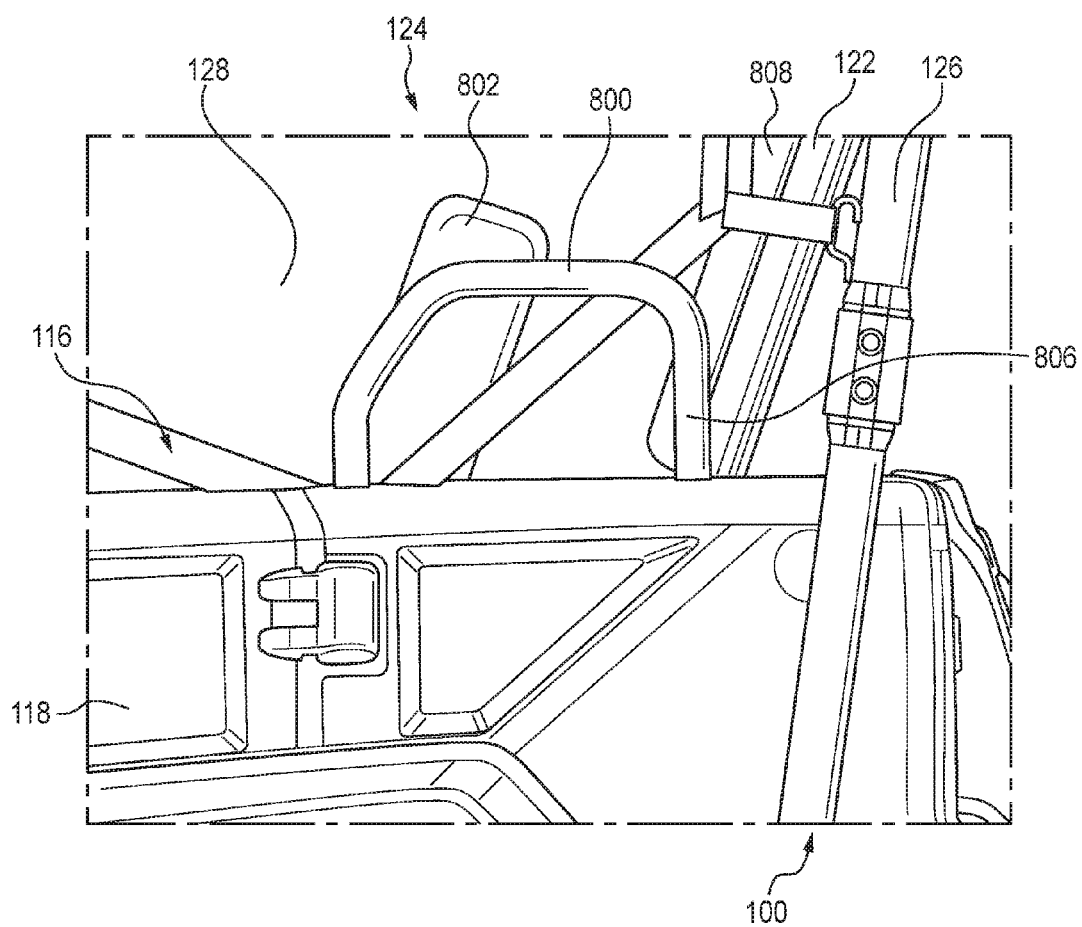
FIG. 8 is a close up view of an embodiment of a rear lateral retention member of the motor vehicle in FIG. 1.
Figure 9:
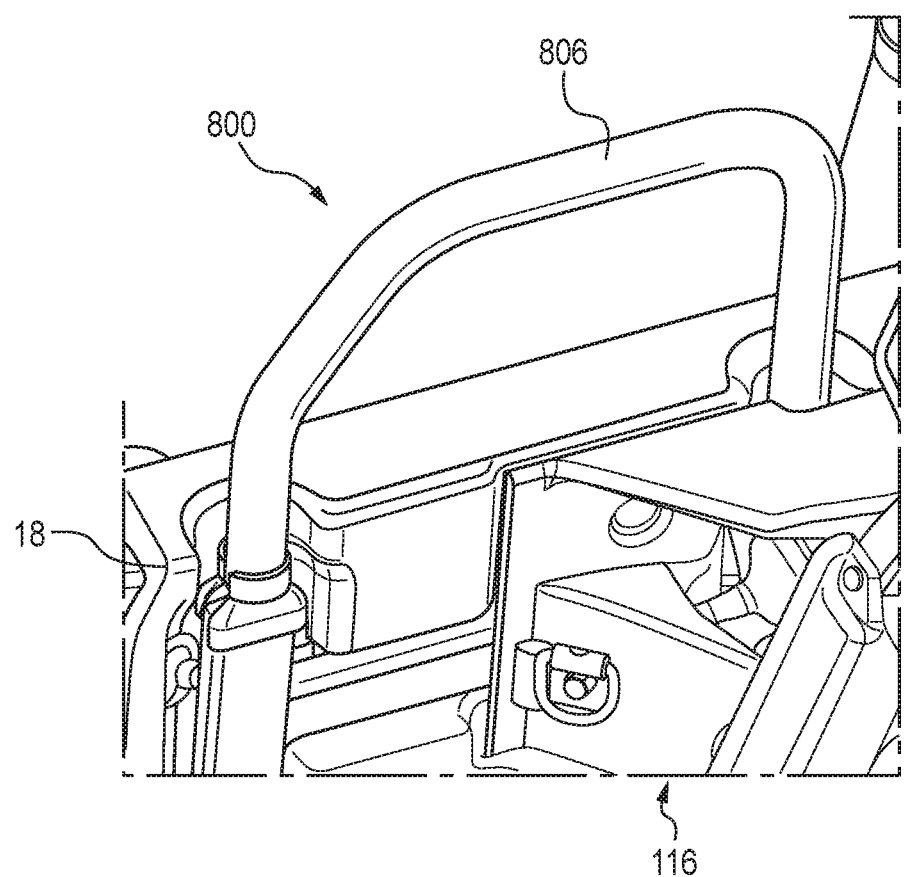
FIG. 9 is a side perspective view of the rear lateral retention member of FIG. 8.
Figure 10:
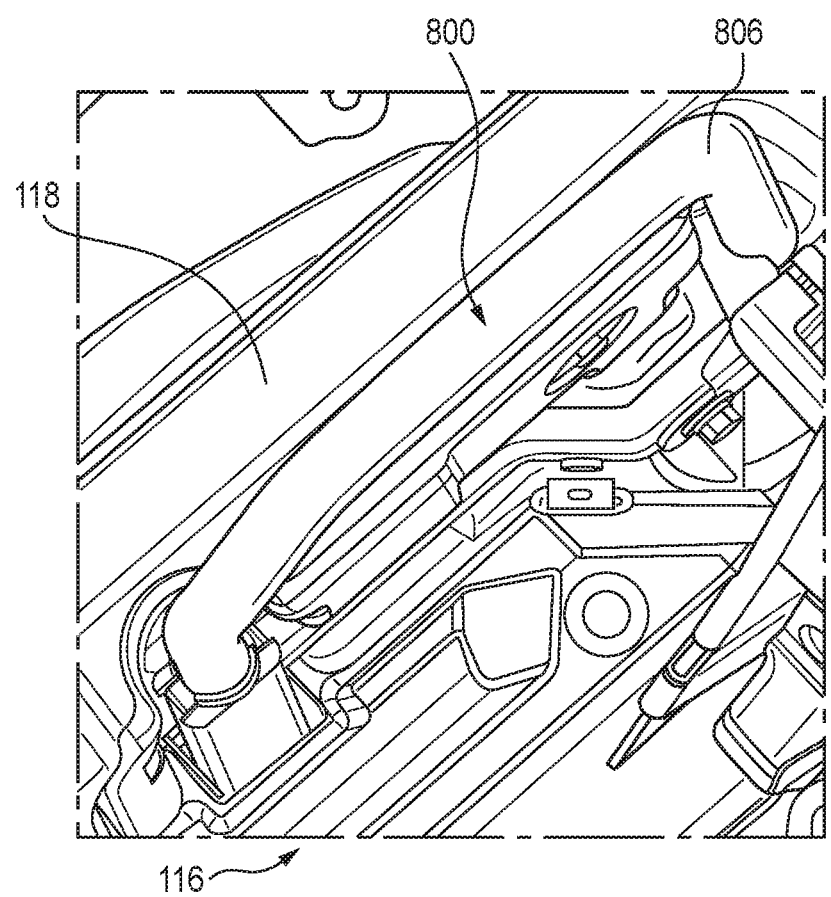
FIG. 10 is a top perspective view of the rear lateral retention member of FIG. 8.
Figure 11:
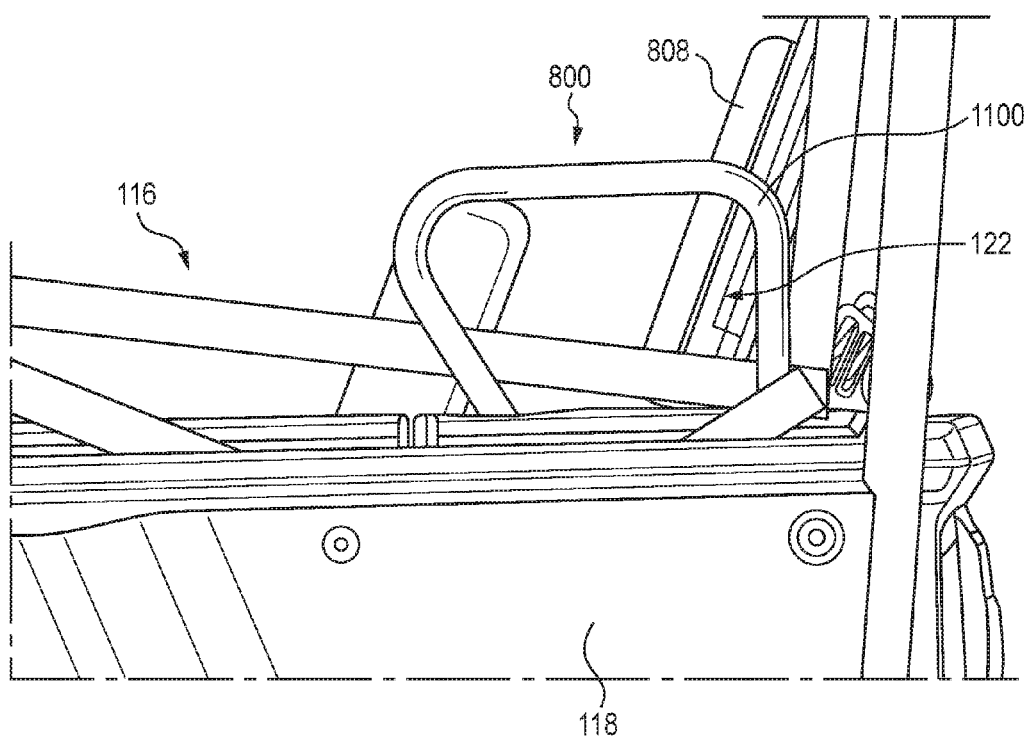
FIG. 11 is a close up view of another embodiment of a rear lateral retention member of the motor vehicle in FIG. 1.
Figure 12:
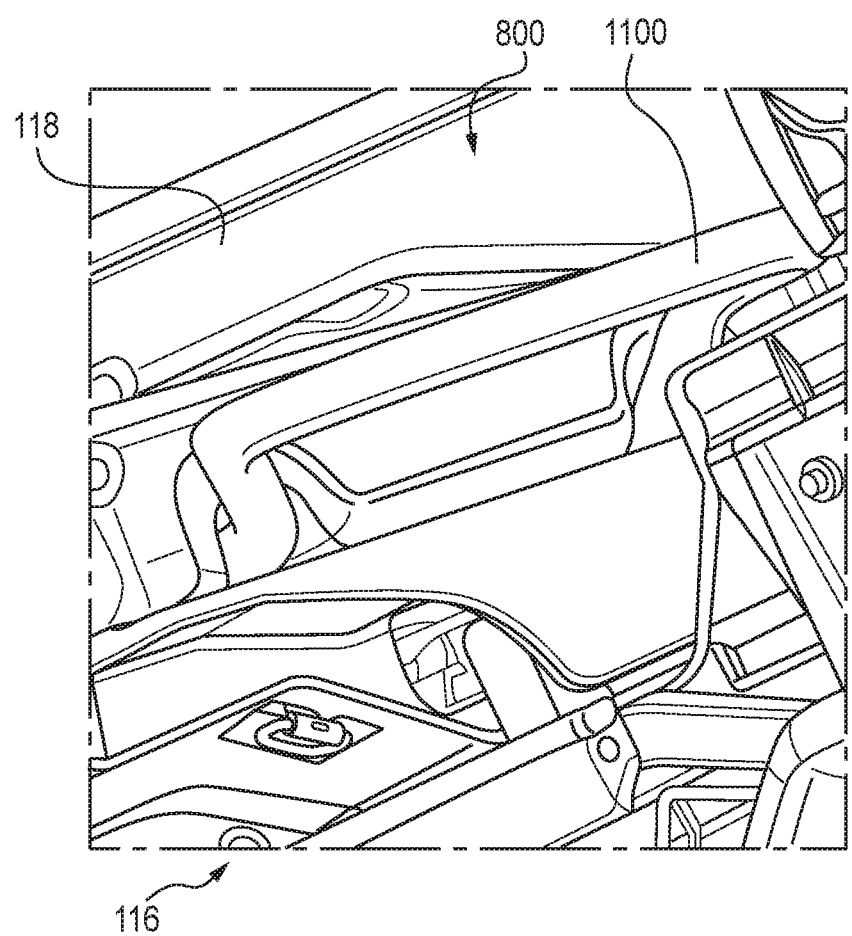
FIG. 12 is a top perspective view of the rear lateral retention member of FIG. 11.
Figure 13:
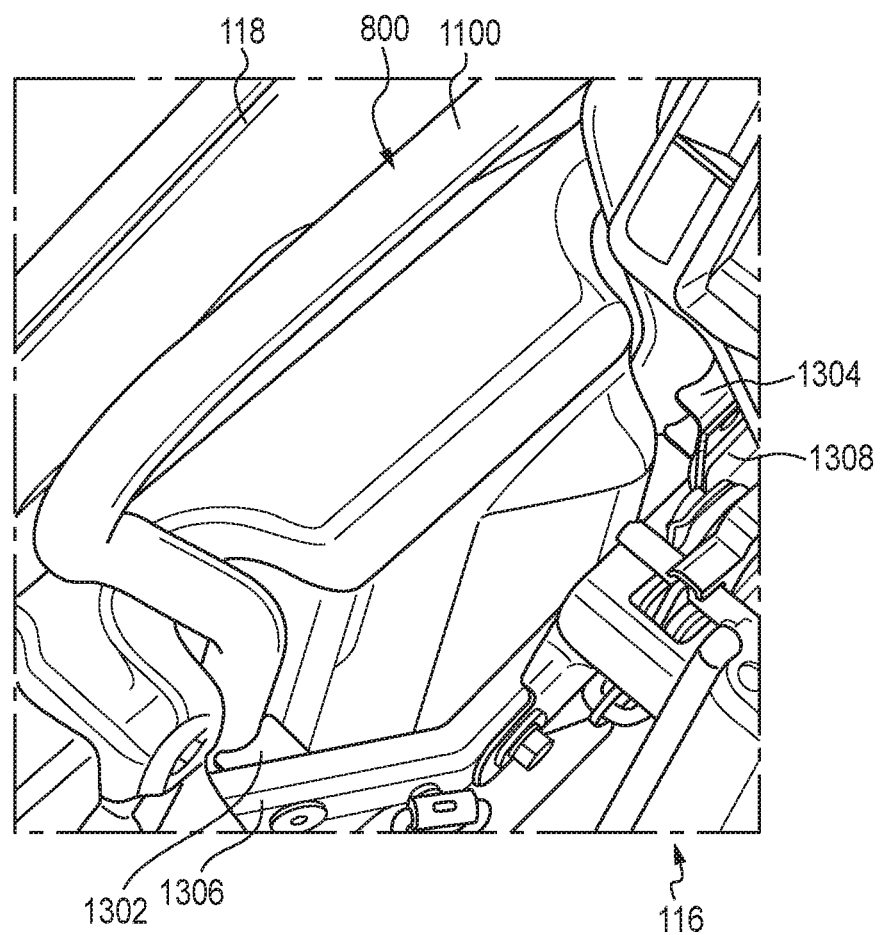
FIG. 13 is a side perspective view of the rear lateral retention member of FIG. 11.

The roll over protection structure 124 further includes a rear lateral retention member 800, one embodiment of which is illustrated in FIGS. 8-10, and a second embodiment of which is illustrated in FIGS. 11-13. The rear lateral retention member 800 operates as part the roll over protection structure 124 by being adjacent the torso of a user seated in the rear seat 122 to keep the torso inside of the motor vehicle 100 during a rollover event. As shown in FIG. 8, block 802 represents the upper arm of a user seated in the rear seat 122 of the motor vehicle 100. The rear lateral retention member 800 is a generally U-shaped tube or pipe 806, the ends of which are welded to the side wall 118 of the bed 116 of the motor vehicle 100. The rear lateral retention member 800 is located primarily forward of the seat back 808, above the seat cushion (not shown), and beneath the top of the block 802, signifying that the rear lateral retention member 800 is adjacent the upper arm and beneath the shoulder of the typical user. In the embodiment shown, the netting 128 is located inside of the rear lateral retention member 800, between the rear lateral retention member 800 and the rear seat 122.

FIGS. 11-13 illustrate an alternate embodiment of the rear lateral retention member 800. As illustrated in FIG. 13, the rear lateral retention member 800 is a generally U-shaped tube or pipe 1100 that includes brackets 1302, 1304 at each end. The brackets 1302, 1304 are in turn bolted to the side wall 118 of the bed 116. The first bracket 1302 is bolted to a first portion 1306 of the side wall 118 of the bed 116, and as shown in FIGS. 12-13, the second bracket 1304 is bolted to a second portion 1308 of the side wall 118 of the bed 116. As with the previous embodiment, the rear lateral retention member 800 is located primarily forward of the seat back 808, above the seat cushion (not shown), and beneath the top of the block 802, signifying that the rear lateral retention member 800 is adjacent the upper arm and beneath the shoulder of the typical user as seated in the rear seat 122.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A motor vehicle, comprising:
   a frame;
   a first pair of wheels connected to the frame;
   a second pair of wheels connected to the frame;
   a motor supported by the frame and operatively connected to at least one of the pair of wheels;
   a cockpit in the frame;
   a first seat disposed in the cockpit;
   a bed in the frame longitudinally rearward of the cockpit, the bed having at least one side wall;
   a second seat disposed in the bed, the second seat having a seat base and a seat back, the seat back being foldable between a storage position and a seating position; and
   a lateral retention member fixed to and extending upwardly from and at least partially above a top edge of the at least one side wall of the bed, at least a portion of the lateral retention member being disposed higher than the seat base and forward of the seat back of the second seat when in the seating position.

2. The motor vehicle of claim 1 wherein the lateral retention member comprises:
   a generally U-shaped pipe having first and second ends; and
   wherein the first and second ends are attached to the at least one side wall of the bed.

3. The motor vehicle of claim 2 wherein the first and second ends are welded to the at least one side wall of the bed.

4. The motor vehicle of claim 2 wherein the lateral retention member further comprises:
   a first bracket attached to the first end of the generally U-shaped pipe;
   a second bracket attached to the second end of the generally U-shaped pipe; and
   wherein the first bracket and second bracket are bolted to the at least one side wall of the bed.

5. A motor vehicle, comprising:
   a frame;
   a first pair of wheels connected to the frame;
   a second pair of wheels connected to the frame;
   a motor supported by the frame and operatively connected to at least one of the pair of wheels;
   a cockpit in the frame;
   a roll cage supported by the frame encapsulating the cockpit;
   a first seat disposed in the cockpit;

a bed in the frame longitudinally rearward of the cockpit, the bed having at least one side wall;
a second seat disposed in the bed, the second seat having a seat base and a seat back, the seat back being foldable between a storage position and a seating position;
a first lateral retention member fixed to the roll cage, at least a portion of the lateral retention member being disposed higher than the seat base and forward of the seat back of the first seat when in the seating position; and
a second lateral retention member fixed to and extending upwardly from and at least partially above a top edge of the at least one side wall of the bed, at least a portion of the lateral retention member being disposed higher than the seat base and forward of the seat back of the second seat when in the seating position.

6. The motor vehicle of claim 5 wherein the second lateral retention member comprises:
a generally U-shaped pipe having first and second ends; and
wherein the first and second ends are attached to the at least one side wall of the bed.

7. The motor vehicle of claim 6 wherein the first and second ends are welded to the at least one side wall of the bed.

8. The motor vehicle of claim 6 wherein the second lateral retention member further comprises:
a first bracket attached to the first end of the generally U-shaped pipe;
a second bracket attached to the second end of the generally U-shaped pipe; and
wherein the first bracket and second bracket are bolted to the at least one side wall of the bed.

9. The motor vehicle of claim 5 wherein the first lateral retention member comprises:
a generally U-shaped pipe having first and second ends; and
wherein the first and second ends are attached to the roll cage.

10. The motor vehicle of claim 9 wherein the first and second ends are welded to the roll cage.

11. The motor vehicle of claim 5 wherein the first lateral retention member comprises:
a generally L-shaped pipe having first and second ends; and
wherein the first and second ends are attached to the roll cage.

12. The motor vehicle of claim 11 wherein the first lateral retention member further comprises:
a first bracket attached to the first end of the generally L-shaped pipe;
a second bracket attached to the second end of the generally L-shaped pipe; and
wherein the first bracket and second bracket are bolted to the roll cage.

13. A motor vehicle, comprising:
a frame;
a first pair of wheels connected to the frame;
a second pair of wheels connected to the frame;
a motor supported by the frame and operatively connected to at least one of the pair of wheels;
a cockpit in the frame;
a first seat disposed in the cockpit;
a bed in the frame longitudinally rearward of the cockpit, the bed having a first side wall and a second side wall;
a second seat disposed in the bed, the second seat having a seat base and a seat back, the seat back being foldable between a storage position and a seating position;
a first lateral retention member fixed to and extending upwardly from the first side wall of the bed, at least a portion of the lateral retention member being disposed higher than the seat base and forward of the seat back of the second seat when in the seating position; and
a second lateral retention member fixed to and extending upwardly from and at least partially above a top edge of the second side wall of the bed, at least a portion of the lateral retention member being disposed higher than the seat base and forward of the seat back of the second seat when in the seating position.

14. The motor vehicle of claim 13 wherein the first lateral retention member comprises a generally U-shaped first pipe having first and second ends, wherein the first and second ends are attached to the first side wall of the bed, and the second lateral retention member comprises a generally U-shaped second pipe having first and second ends, wherein the first and second ends are attached to the second side wall of the bed.

15. The motor vehicle of claim 14 wherein the first and second ends of the first pipe are welded to the first side wall of the bed and the first and second ends of the second piper are welded to the second side wall of the bed.

16. The motor vehicle of claim 14 further comprising:
a first bracket attached to the first end of the generally U-shaped first pipe;
a second bracket attached to the second end of the generally U-shaped pipe;
a third bracket attached to the first end of the generally U-shaped second pipe;
a fourth bracket attached to the second end of the generally U-shaped second pipe; and
wherein the first bracket and second bracket are bolted to the first side wall of the bed and the third bracket and fourth bracket are bolted to the second side wall of the bed.

* * * * *